(12) United States Patent
Kim et al.

(10) Patent No.: US 10,057,002 B2
(45) Date of Patent: Aug. 21, 2018

(54) METHOD AND APPARATUS FOR REMOVING INTERFERENCE AND RECEIVING SIGNAL IN WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 15/038,393

(22) PCT Filed: Dec. 29, 2014

(86) PCT No.: PCT/KR2014/012966
§ 371 (c)(1),
(2) Date: May 20, 2016

(87) PCT Pub. No.: WO2015/099510
PCT Pub. Date: Jul. 2, 2015

(65) Prior Publication Data
US 2016/0295454 A1    Oct. 6, 2016

Related U.S. Application Data

(60) Provisional application No. 61/921,514, filed on Dec. 29, 2013.

(51) Int. Cl.
*H04J 11/00* (2006.01)
*H04B 7/0456* (2017.01)
(Continued)

(52) U.S. Cl.
CPC ............ *H04J 11/005* (2013.01); *H04B 7/024* (2013.01); *H04B 7/0413* (2013.01);
(Continued)

(58) Field of Classification Search
None
See application file for complete search history.

(56) References Cited

U.S. PATENT DOCUMENTS

2010/0027697 A1* 2/2010 Malladi ................ H04B 7/0417
375/260
2013/0155967 A1* 6/2013 Kang .................... H04W 28/18
370/329
(Continued)

FOREIGN PATENT DOCUMENTS

KR  10-2011-0104103   9/2011
WO  2013/032271 A2   3/2013

OTHER PUBLICATIONS

Alcatel Lucent, Alcatel Lucent Shanghai Bell, "Considerations on NAIC in HetNet", 3GPP TSG-RAN WG1 Meeting #74, Barcelona, Spain, Aug. 19-23, 2013.*
(Continued)

*Primary Examiner* — Joseph A Bednash
(74) *Attorney, Agent, or Firm* — Lee Hong Degerman Kang Waimey

(57) ABSTRACT

The present invention relates to a wireless communication system. A method for a terminal for removing interference and receiving a signal in a wireless communication system according to one embodiment of the present invention may comprises the steps of: receiving configuration information for channel status information; and reporting, to a base station, the channel status information, and an indicator of whether the channel status information has been calculated on the basis of network-assisted interference cancellation and suppression (NAICS).

8 Claims, 13 Drawing Sheets

(51) Int. Cl.
*H04L 5/00* (2006.01)
*H04L 1/00* (2006.01)
*H04B 7/024* (2017.01)
*H04B 7/06* (2006.01)
*H04W 28/04* (2009.01)
*H04B 7/0413* (2017.01)

(52) U.S. Cl.
CPC ......... *H04B 7/0456* (2013.01); *H04B 7/0626* (2013.01); *H04B 7/0632* (2013.01); *H04L 1/00* (2013.01); *H04L 5/00* (2013.01); *H04W 28/04* (2013.01); *H04B 7/063* (2013.01); *H04B 7/0639* (2013.01)

(56) References Cited

U.S. PATENT DOCUMENTS

| | | | | |
|---|---|---|---|---|
| 2013/0301450 | A1* | 11/2013 | Geirhofer | H04L 5/0057 370/252 |
| 2014/0044061 | A1* | 2/2014 | Yue | H04W 72/042 370/329 |

OTHER PUBLICATIONS

Broadcom Corporation, "Discussion on Coordination and Signaling in NAICS", 3GPP TSG RAN WG1 Meeting #74bis, Guangzhou, China, Oct. 7-11, 2013.*
Intel Corporation, "Link level simulation and discussion on FeICIC CSI", 3GPP TSG-RAN WG4 Meeting #67, Fukuoka Japan, May 20-May 24, 2013.*
MediaTek Inc., "On Network signalling/coordination for NAICS and possible specification impact", 3GPP TSG-RAN WG1#75, San Francisco, USA, Nov. 11-15, 2013, R1-135884 (Year: 2013).*
Research in Motion, "RRM Aspects of Network Assisted Interference Calculation", 3GPP TSG RAN WG1 Meeting #73, Fukuoka, Japan, May 20-24, 2013, R1-132389 (Year: 2013).*
Orange, "NAICS: How to coordinate link adaptation for CWIC receivers", TSG-RAN WG1 #74bis, Guangzhou, China, Oct. 7-11, 2013, R1-134673 (Year: 2013).*
Intel Corporation, "Discussion on CSI enhancements for eIMTA Support", 3GPP TSG RAN WG1 Meeting #74bis, San Francisco, USA, Nov. 11-15, 2013, R1-135099 (Year: 2013).*
Huawei, HiSilicon, "Considerations o network assissted signalling for IC UE", 3GPP TSG RAN WG1 Meeting #74bis, Guangzhou, China, Oct. 7-11, 2013, R1-134679 (Year: 2013).*
International Search Report and Written Opinion issued in PCT/KR/2014/012966, dated Mar. 20, 2015, 26 pages.
3GPP TR 36.866 V1.1.0, 3GPP; TSGRAN; Network-Assisted Interference Cancellation and Suppression for LTE (Release 12), Valbonne, France, Dec. 16, 2013, 59 pages.
Alcatel-Lucent, Alacatel-Lucent Shanghai Bell, "Considerations on NAIC in HetNet," 3GPP TSG-RAN WG1 Meeting #74, R1-132949, Barcelona, Spain, Aug. 19-23, 2013, 2 pages.
Samsung, "Discussion on further details of NAICS evaluation," 3GPP TSG RAN1 #73, R1-131998, Fukuoka, Japan, May 20-24, 2013, 4 pages.

* cited by examiner

FIG. 5
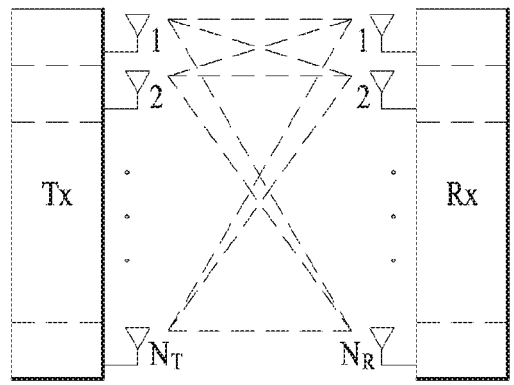
(a)
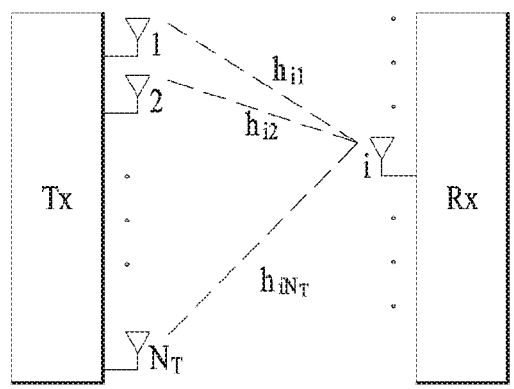
(b)

METHOD AND APPARATUS FOR REMOVING INTERFERENCE AND RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/012966, filed on Dec. 29, 2014, which claims the benefit of U.S. Provisional Application No. 61/921,514, filed on Dec. 29, 2013, the contents of which are all hereby incorporated by reference herein in their entirety.

TECHNICAL FIELD

The present invention relates to a wireless communication system, and more particularly, to a method of removing interference and receiving a signal in a wireless communication system and an apparatus therefor.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-precoded channel information. Accordingly, a receiver of a system according to LTE-A standard can define a RS for acquisition of channel state information (CSI), that is, CSI-RS.

DISCLOSURE OF THE INVENTION

Technical Tasks

The present invention intends to propose a method of removing interference and receiving a signal in a wireless communication system and an apparatus therefor in the following based on the aforementioned discussion.

Technical tasks obtainable from the present invention are non-limited the above-mentioned technical task. And, other unmentioned technical tasks can be clearly understood from the following description by those having ordinary skill in the technical field to which the present invention pertains.

TECHNICAL SOLUTION

To achieve these and other advantages and in accordance with the purpose of the present invention, as embodied and broadly described, according to one embodiment, a method of receiving a signal, which is received by a user equipment by cancelling interference from the signal in a wireless communication system, includes the steps of receiving configuration information on channel state information and reporting the channel state information and an indicator indicating whether or not the channel state information is calculated based on NAICS (network-assisted interference cancellation and suppression) to a base station.

The reporting step can reports both normal channel state information not calculated based on the NAICS and NAICS channel state information calculated based on the NAICS.

If reporting of the normal channel state information and reporting of the NAICS channel state information are collided with each other in a subframe, the NAICS channel state information can be preferentially reported.

The NAICS channel state information can be reported by a difference value between the NAICS channel state information and the normal channel state information.

The channel state information corresponds to a CQI (Channel Quality Indicator) and the difference value can be reported instead of a wideband CQI.

The normal channel state information and the NAICS channel state information can be reported at the same time only when an RI (Rank Indicator) corresponds to 1.

If the indicator corresponds to a first value, the indicator indicates there is no interference information request for the NAICS and if the indicator corresponds to a second value, the indicator can indicate an interference information request for the NAICS.

To further achieve these and other advantages and in accordance with the purpose of the present invention, according to a different embodiment, a user equipment receiving a signal by cancelling interference from the signal in a wireless communication system can include an RF (Radio Frequency) unit and a processor configured to receive configuration information on channel state information, the processor configured to report the channel state information and an indicator indicating whether or not the channel state information is calculated based on NAICS (network-assisted interference cancellation and suppression) to a base station.

The processor can be configured to report both normal channel state information not calculated based on the NAICS and NAICS channel state information calculated based on the NAICS.

If reporting of the normal channel state information and reporting of the NAICS channel state information are collided with each other in a subframe, the NAICS channel state information can be preferentially reported.

The NAICS channel state information can be reported by a difference value between the NAICS channel state information and the normal channel state information.

The channel state information corresponds to a CQI (Channel Quality Indicator) and the difference value can be reported instead of a wideband CQI.

The normal channel state information and the NAICS channel state information can be reported at the same time only when an RI (Rank Indicator) corresponds to 1.

If the indicator corresponds to a first value, the indicator indicates there is no interference information request for the NAICS and if the indicator corresponds to a second value, the indicator can indicate an interference information request for the NAICS.

ADVANTAGEOUS EFFECTS

According to embodiments of the present invention, it is able to provide a method for a terminal to remove interference and receive a signal in a wireless communication system and an apparatus therefor.

Effects obtainable from the present invention may be non-limited by the above mentioned effect. And, other unmentioned effects can be clearly understood from the following description by those having ordinary skill in the technical field to which the present invention pertains.

It is able to use an information-reference signal.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a schematic diagram illustrating a wireless communication system having multiple antennas;

BEST MODE

Mode for Invention

Figure 1:
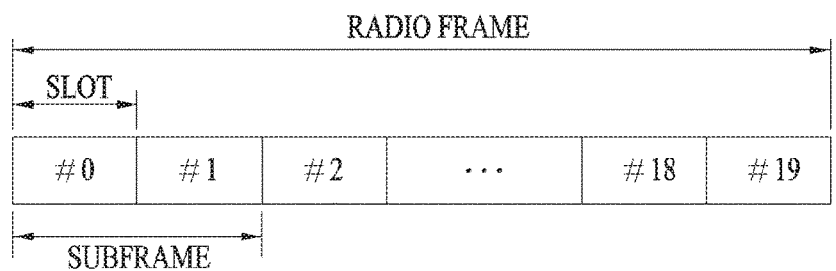
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
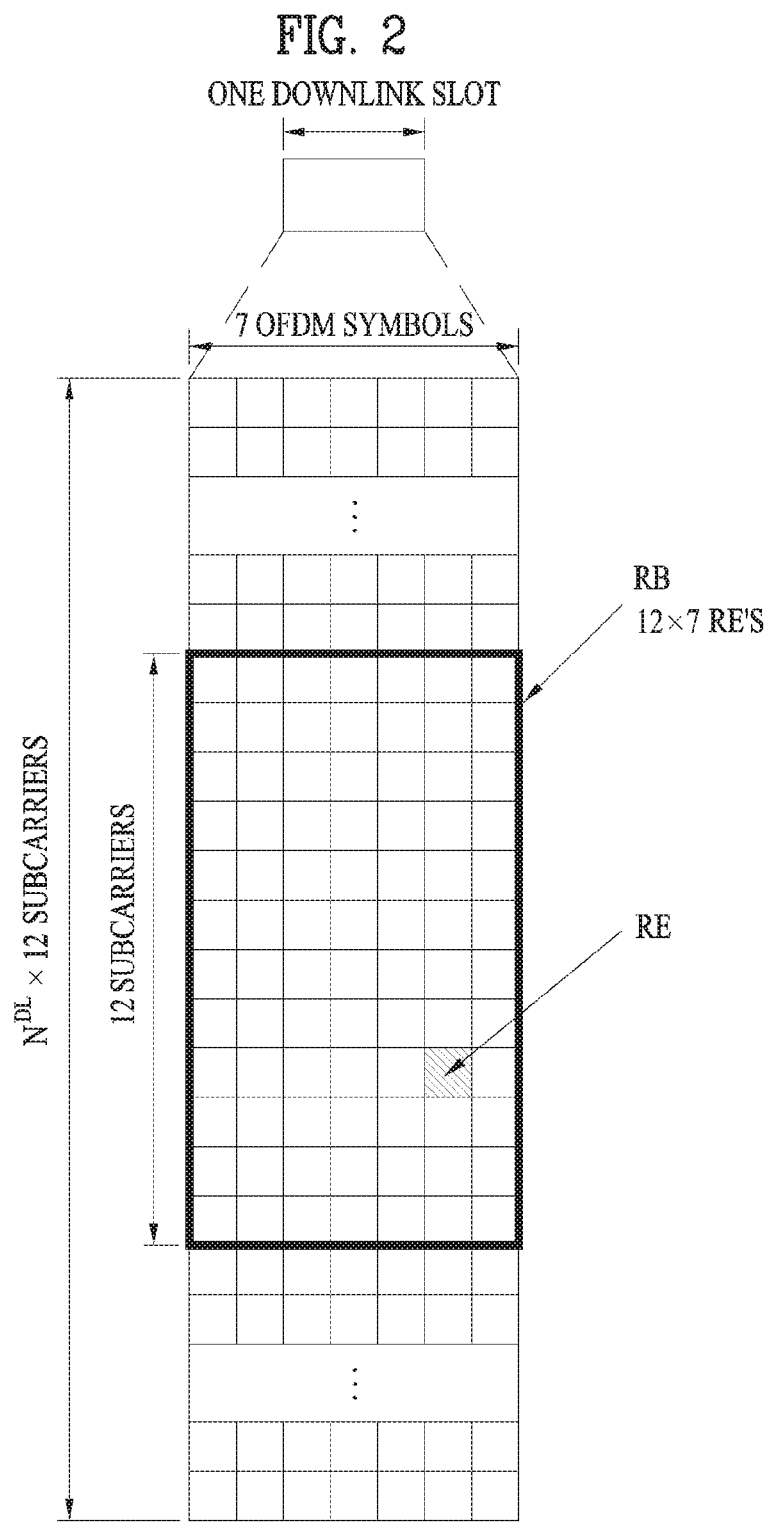
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
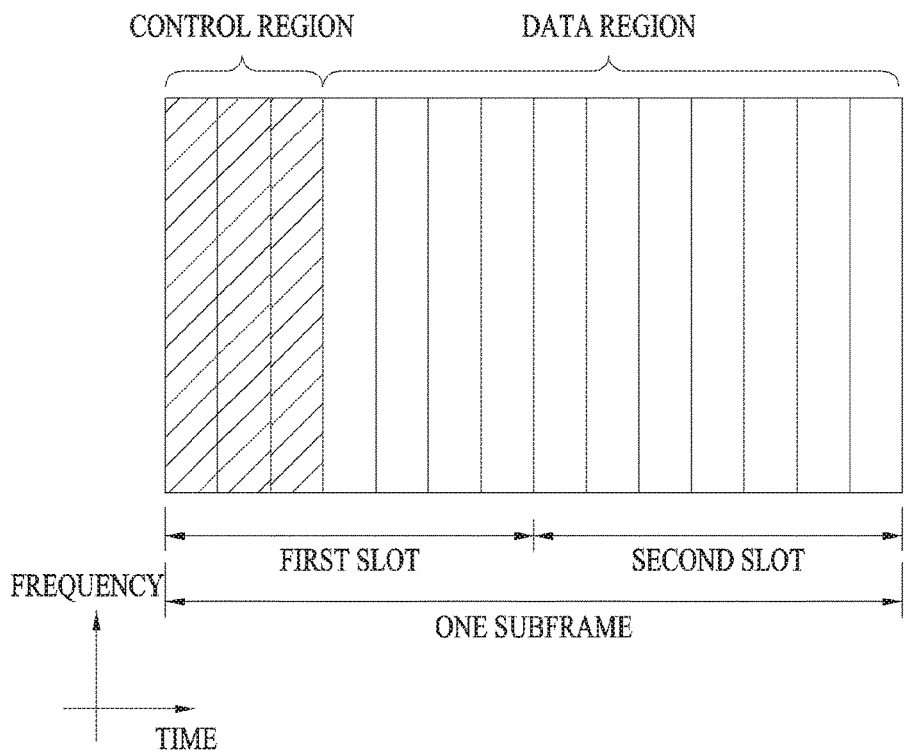
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
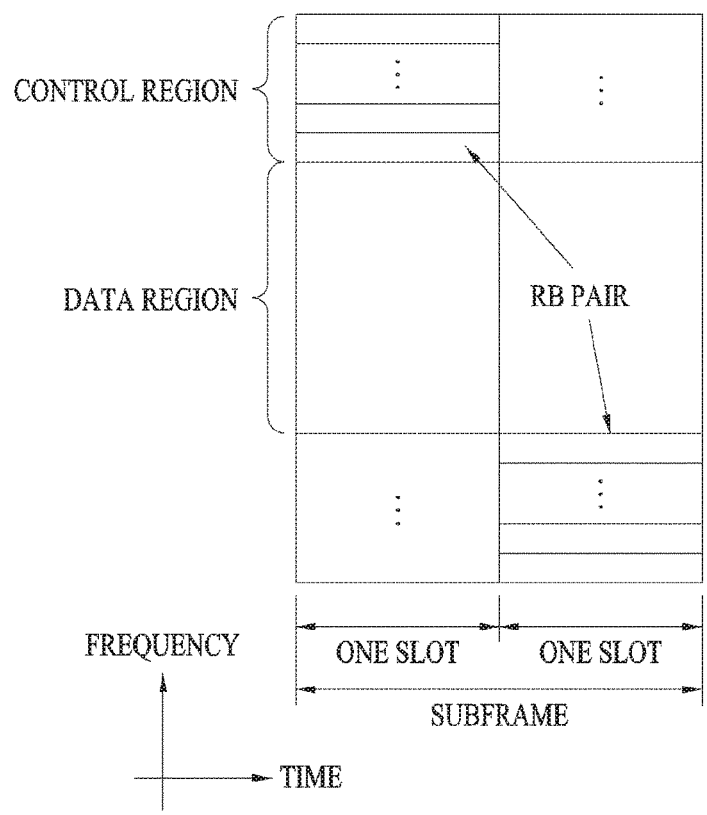
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T \times N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} =$$  [Equation 5]

$$\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Here, $W_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y = [y_1, y_2, \ldots, y_{N_R}]^T$$  [Equation 6]

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T = [h_{i1}, h_{i2}, \ldots, h_{iN_T}]$$  [Equation 7]

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$  [Equation 8]

Additive white Gaussian noise (AWGN) is added to an actual channel which has passed the channel matrix. The AWGN (n1, n2, . . . , nNR) added to each of NR reception (Rx) antennas can be represented by Equation 9 below.

$$n = [n_1, n_2, \ldots, n_{N_R}]^T$$  [Equation 9]

A reception signal calculated by the above-mentioned equations can be represented by Equation 10 below.

$$y = \begin{bmatrix} y_1 \\ y_2 \\ \vdots \\ y_i \\ \vdots \\ y_{N_k} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} +$$  [Equation 10]

$$\begin{bmatrix} n_1 \\ n_2 \\ \vdots \\ n_i \\ \vdots \\ n_{N_R} \end{bmatrix} = Hx + n$$

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

rank $(H) \leq \min(N_T, N_R)$  [Equation 11]

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
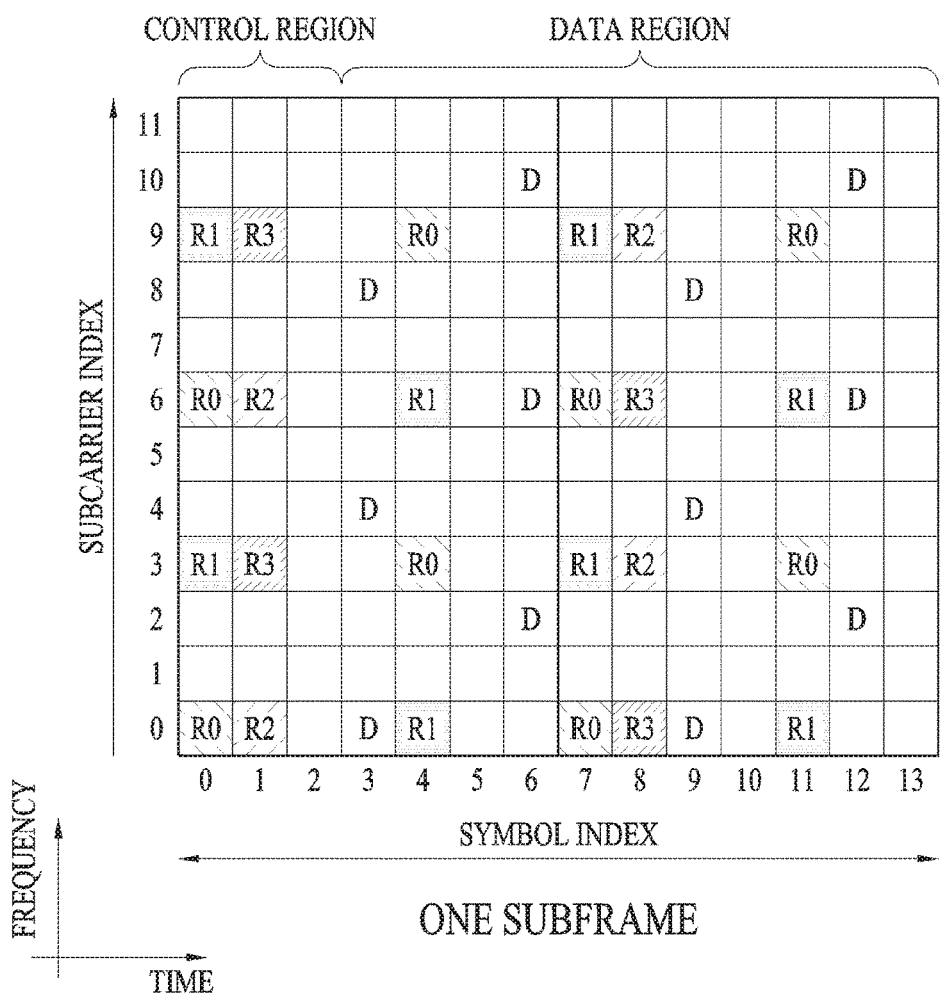
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
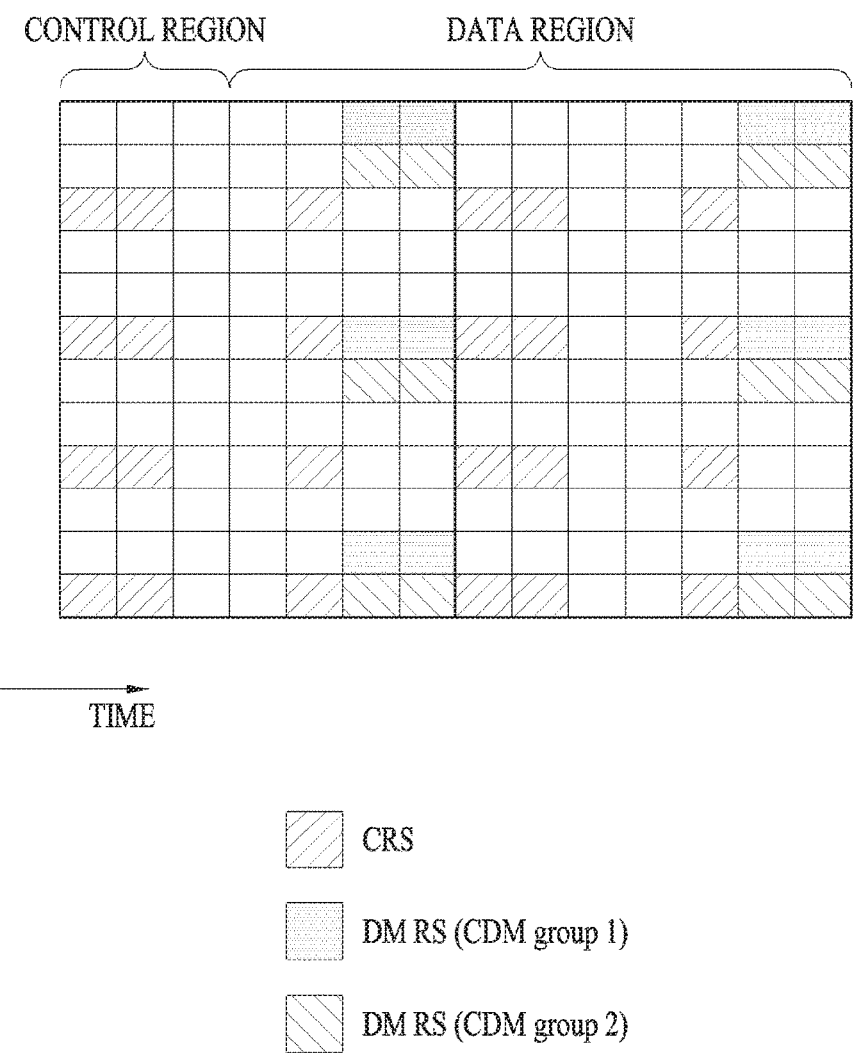
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that th.

DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
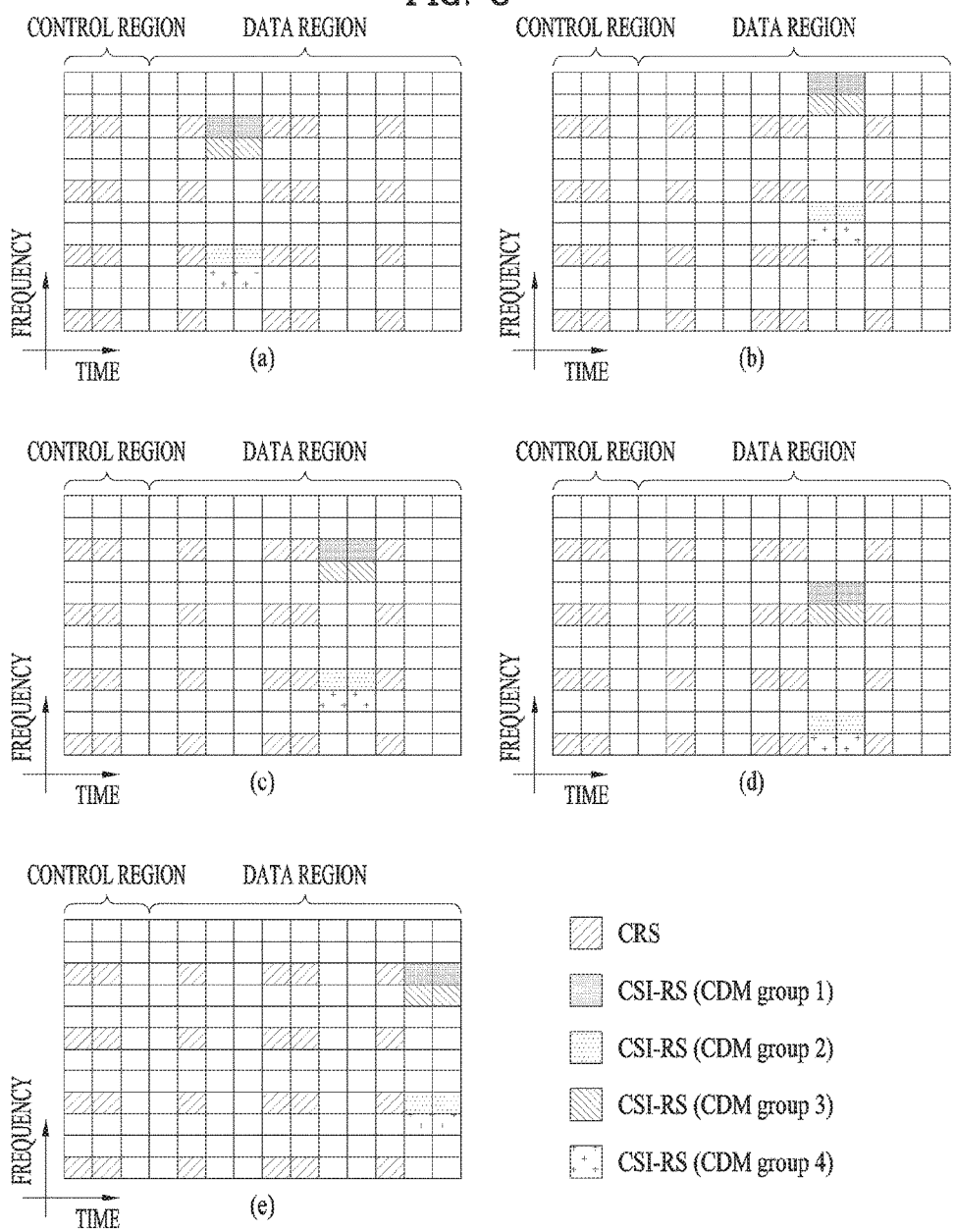
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(*a*) to 8(*e*) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(*a*), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(*a*) is applicable to the CSI-RS patterns illustrated in FIGS. 8(*b*) to 8(*e*).

RS patterns shown in FIGS. 6 to 8 are disclosed only for illustrative purposes, and the scope or spirit of the present invention are not limited only to a specific RS pattern. That is, even in the case in which RS patterns different from those of FIGS. 6 to 8 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 8(a) to 8(e)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 8, the CSI-RS for each antenna port can be multiplexed by the FDM, the TDM and/or the CDM scheme using an orthogonal frequency resource, an orthogonal time resource and/or an orthogonal code resource.

When the base station informs the UEs in a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 9:
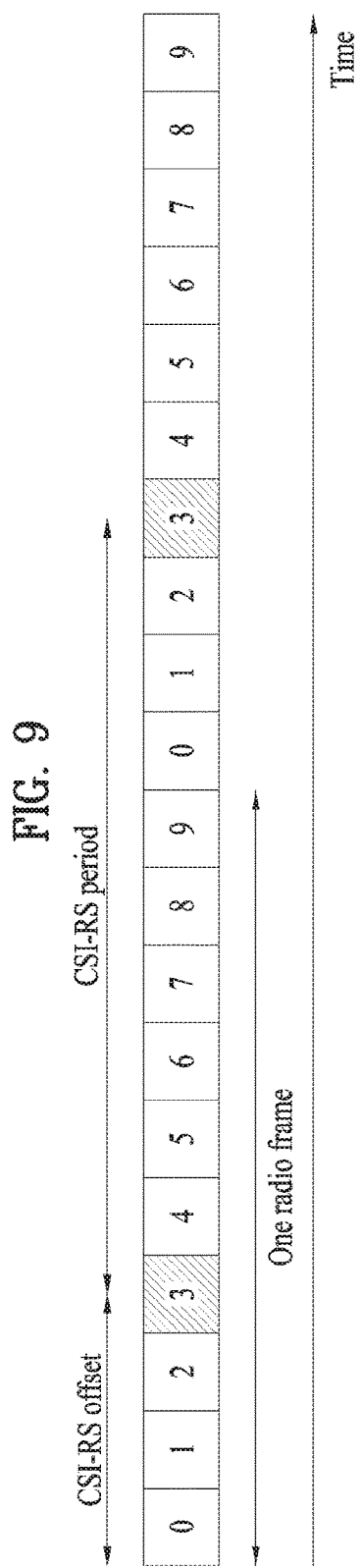
FIG. 9 is a diagram for explaining an example of a scheme of periodically transmitting a CSI-RS.

FIG. 9 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 9 shows a radio frame configured by 10 subframes (subframe number 0 to 9). In FIG. 9, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 10:
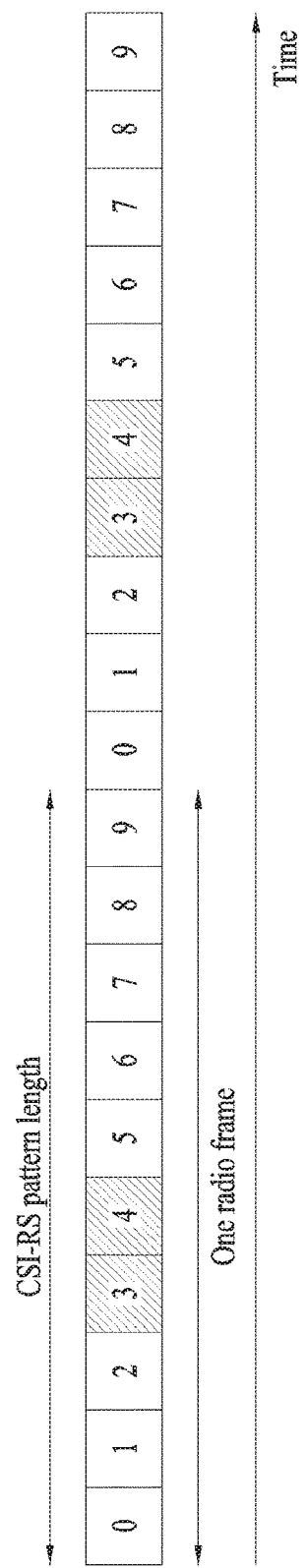
FIG. 10 is a diagram for explaining an example of a scheme of aperiodically transmitting a CSI-RS.

FIG. 10 is a diagram for explaining an example of a scheme of aperiodically transmitting a CSI-RS. In FIG. 10, for example, one radio frame is configured by 10 subframes (subframe number 0 to 9). As shown in FIG. 10, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 10 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when a base station informs UEs of contents on system information, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This type of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB 10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 11:
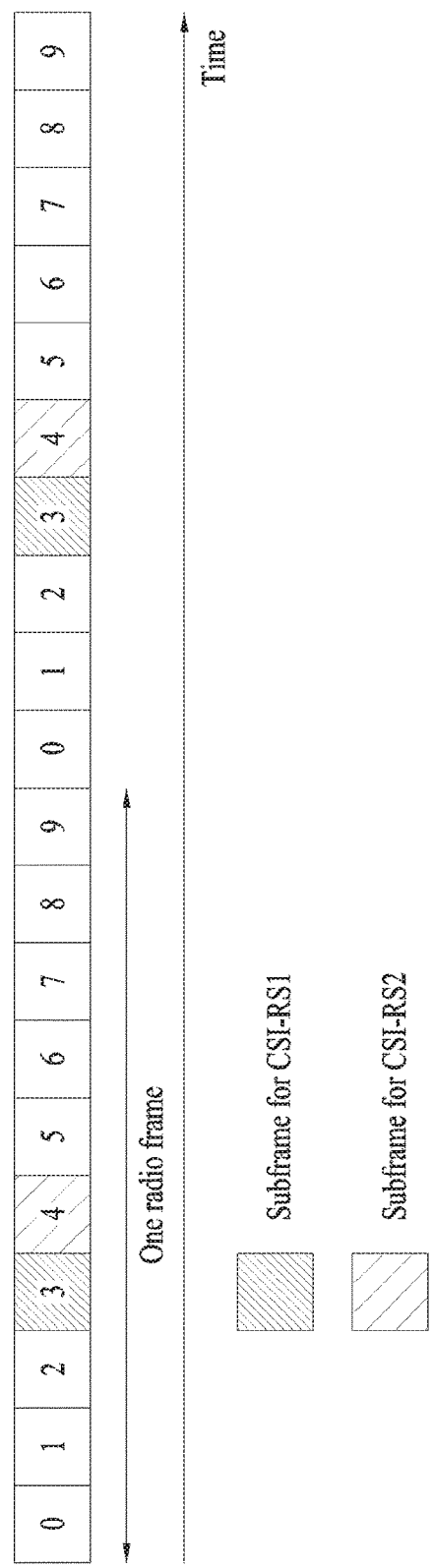
FIG. 11 is a diagram for explaining an example of using two CSI-RS configurations.

FIG. 11 is a diagram for explaining an example of using two CSI-RS configurations. In FIG. 11, for example, one radio frame is configured by 10 subframes (subframe number 0 to 9). In FIG. 11, in case of a first CSI-RS configuration, i.e., a CSI-RS1, a transmission period of a CSI-RS is 10 ms and a transmission offset of a CSI-RS is 3. In FIG. 11, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 11, if the base station asks the UE to make a feedback on the first CSI-RS configuration (CSI-RS1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by a CRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 8 (*a*) and a CSI-RS according to another CSI-RS configuration is designated to be transmitted in an RE position shown in FIG. 8 (*b*)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

Quasi Co-Located (QC)

A UE can receive data from a plurality of transmission points (TPs) (e.g., a TP1 and a TP2). Hence, the UE is able to transmit channel state information on a plurality of the TPs. In this case, RSs can also be transmitted to the UE from a plurality of the TPs. In this case, if it is able to share properties for channel estimation from RS ports different from each other of TPs different from each other, it may be able to reduce load and complexity of reception processing of the UE. Moreover, if it is able to share properties for channel estimation from RS ports different from each other of an identical TP between the RS ports, it may be able to reduce load and complexity of reception processing of the UE. Hence, LTE-A system proposes a method of sharing properties for channel estimation between RS ports.

For channel estimation between RS ports, LTE-A system has introduced such a concept as "quasi co-located (QLC)". For example, if two antenna ports are quasi co-located (QC), the UE may assume that large-scale properties of the signal received from the first antenna port can be inferred from the signal received from the other antenna port". In this case, the large-scale properties can include at least one selected from the group consisting of delay spread, Doppler spread, Doppler shift, average gain and average delay. In the following, the quasi co-located is simply referred to as QCL.

In particular, if two antenna ports are QCL, it may indicate that large-scale properties of a radio channel received from one antenna port are identical to large-scale properties of a radio channel received from another antenna port. If antenna ports transmitting RSs different from each other are QCL, large-scale properties of a radio channel received from one antenna port of a type can be replaced with large-scale properties of a radio channel received from one antenna port of a different type.

According to the aforementioned QCL concept, a UE is unable to assume large-scale channel properties identical to each other between radio channels received from non-QCL (NQC) antenna ports. In particular, in this case, a UE should perform an independent processing according to each configured non-QCL antenna port to obtain timing acquisition and tracking, frequency offset estimation and compensation, delay estimation, and Doppler estimation and the like.

A UE can perform operations in the following between antenna ports capable of assuming QCL. First of all, the UE can use delay spread, Doppler spectrum, Doppler spread estimation result for a radio channel received from an antenna port when a channel is estimated for a radio channel received from a different antenna port. Secondly, regarding frequency shift and received timing, after time synchronization and frequency synchronization for a single antenna port are performed, the UE can apply identical synchronization to demodulation of a different antenna port. Thirdly, regarding average received power, the UE can average RSRP (reference signal received power) measurements for over two or more antenna ports.

If a UE receives a DMRS-based DL-related DCI format via a control channel (PDCCH or EPDCCH), the UE performs channel estimation for a corresponding PDSCH via a DM-RS sequence and performs data demodulation. If DMRS port configuration received from a DL scheduling grant is capable of being QCL with a CRS port, the UE can apply the large-scale channel properties estimation estimated from the CRS port as it is in case of estimating a channel via the DMRS port. This is because a CRS corresponds to a reference signal broadcasted in every subframe with relatively high density over a whole band, the estimation on the large-scale channel properties can be more stably obtained from the CRS. On the contrary, since a DMRS is UE-specifically transmitted for a specific scheduled RB and a precoding matrix, which is used by a base station for transmission, may vary according to a PRG unit, an effective channel received by the UE may vary according to the PRG unit. Hence, if a DMRS is used for estimating the large-scale channel properties of a radio channel over a wide band, performance degradation may occur. In case of a CSI-RS, since the CSI-RS has a relatively long transmission period and a relatively low density, if the CSI-RS is used for estimating the large-scale channel properties of the radio channel, performance degradation may occur.

In particular, QCL assumption between antenna ports can be utilized for receiving various DL reference signals, estimating a channel, reporting a channel state and the like.

Method of Cancelling Interference According to the Present Invention

The present invention relates to an ICS (interference cancellation) scheme, i.e., NAICS (Network Assisted Interference Cancellation and Suppression), capable of detecting and cancelling an interference signal of a neighbor cell based on an assistance of a network in a multi-cell environment wireless communication system in which a plurality of cells (e.g., eNB or TP) exist. Specifically, the present invention relates to a method for a UE to perform CSI feedback when the NAICS is performed based on information on an interference signal of a neighbor cell provided by a network or obtained via such a method as BD (Blind Detection) and the like.

Figure 12:
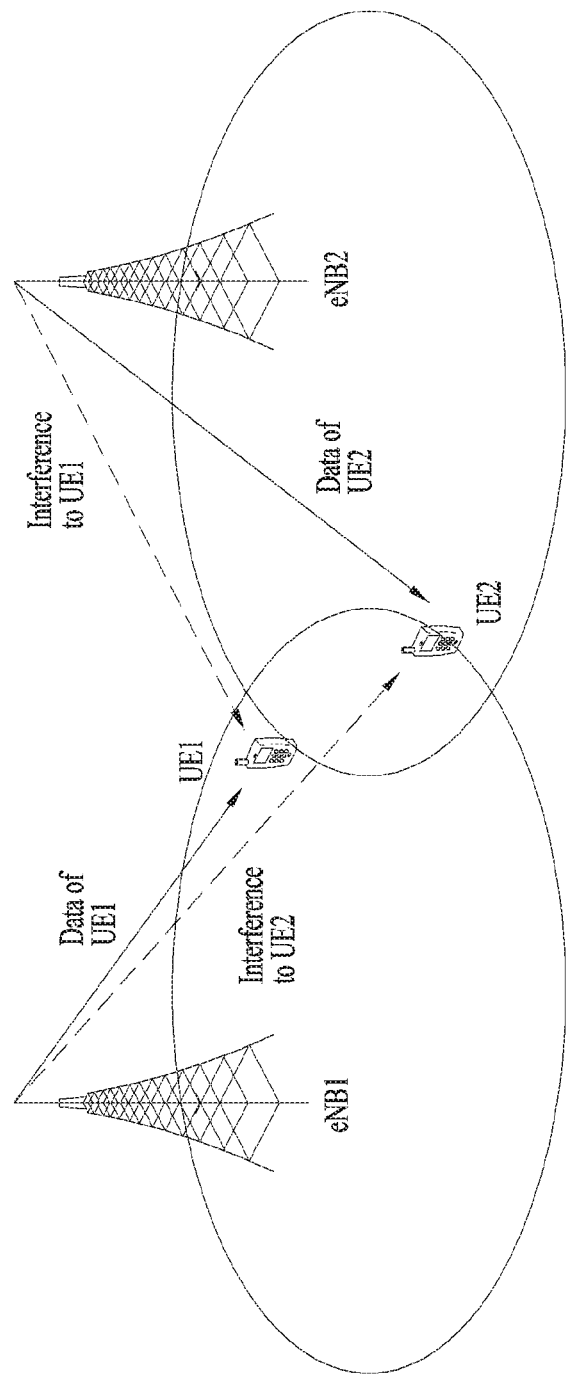
FIG. 12 is a diagram for interference environment that data transmitted to a UE 1 by an eNB 1 gives an interference impact to a UE 2 and data transmitted to the UE 2 by an eNB 2 gives an interference impact to the UE 1 at the same time.

The NAICS (Network Assisted Interference Cancellation and Suppression), which is considered in such an evolved wireless communication system as LTE Rel-12, and the like, corresponds to a scheme for a UE to cancel interference received from a neighbor cell on the basis of an assistance of a network. FIG. 12 is a diagram for interference environment that data transmitted to a UE 1 by an eNB 1 gives an interference impact to a UE 2 and data transmitted to the UE 2 by an eNB 2 gives an interference impact to the UE 1 at the same time when the UE 1 receiving a service from the eNB 1 and the UE 2 receiving a service from the eNB 2 exist in LTE system. In particular, the eNB 1 becomes a serving cell and the eNB 2 becomes an interfering cell in terms of the UE 1 in FIG. 12. In FIG. 12, when the UE 1 performs the NAICS scheme, if the UE 1 attempts to demodulate or decode an interference data transmitted by the eNB 2 and succeeds in removing the interference data from a received signal, it may be able to mitigate interference impact. In the following, for clarity, a UE attempting to perform NAICS is referred to as "NAICS UE".

When the NAICS scheme is performed, there exist interference-related informations capable of assisting a UE for the NAICS transmitted from a network. The informations may include a transmission TM of an interfering cell, a modulation order, an RI, a TPMI, scheduling information and the like for example.

The interference-related informations are used for performing the NAICS in a manner of being transmitted to a UE performing the NAICS in various ways. The interference-related informations can be delivered to a NAICS UE using a semi-static signal or a dynamic signal. A serving base station can deliver the interference-related informations to a UE as well. An interfering base station may directly deliver control information of an interference signal to a UE.

When a backhaul is ideal between base stations, the interference-related informations can be delivered to a UE intending to perform the NAICS in a manner of being shared between the base stations with very small delay. Yet, in case of a non-ideal backhaul, since it is required to have delay of minimum several ms for delivering information between base stations, it is difficult to share information (e.g., TPMI, a modulation order, scheduling information and the like) indicating a dynamic characteristic of a channel between the base stations via the non-ideal backhaul. In this case, if semi-static information is shared only between the base stations and dynamic information is transmitted by an interfering base station using such a method as assisting PDCCH and the like, UEs intending to perform the NAICS can use a method of using the information.

Interference information may vary depending on a victim UE which is interfered according to scheduling of an interfering base station.

Figure 13:
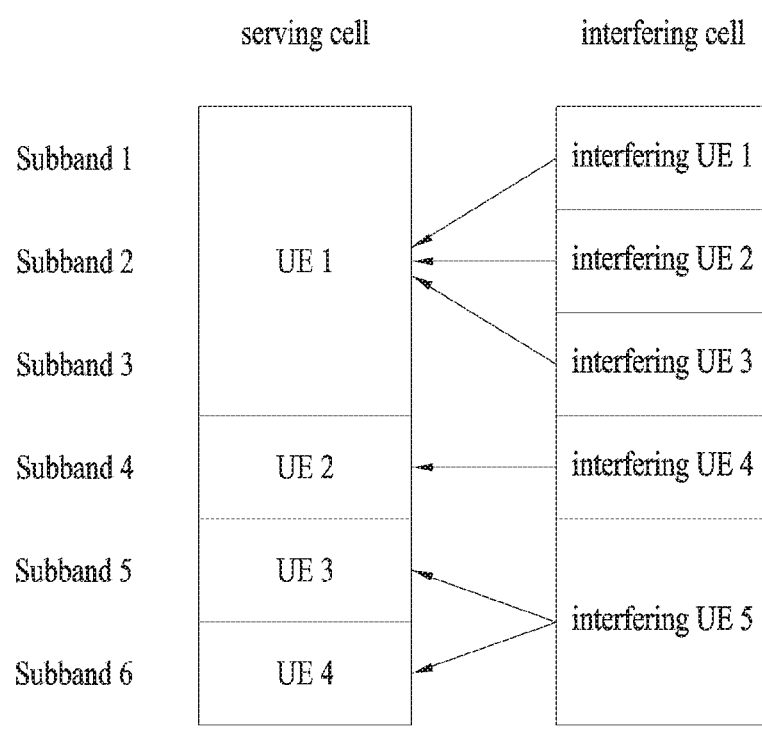
FIG. 13 is a diagram for an example of an interference relationship between UEs of a serving cell and UEs of an interfering cell.

FIG. 13 is a diagram for an example of an interference relationship between UEs of a serving cell and UEs of an interfering cell.

Referring to FIG. 13, since a UE 2 receives interference of a subband 4 only, the UE 2 is necessary for information on interference for an interfering UE 4 only. Yet, since a UE 1 uses subbands 1 to 3, the UE 1 is necessary for information on an interference UE 1 to interference UE 3. If an interfering cell intends to deliver interference information necessary for the UE 1 via unicast, the interfering cell should know that the interference information necessary for the UE 1 corresponds to the information on the UE 1 to UE 3. To this end, it is necessary to share scheduling information between base stations. However, since it is difficult to promptly share the scheduling information in non-ideal backhaul environment, it is difficult for an interfering base station to know UEs requiring interference information and the interference information required by a corresponding UE.

Hence, instead of directly delivering the interference information to a UE requiring the interference information via unicast, it may be necessary to have a method of broadcasting entire interference informations received from the interfering base station. In particular, an interfering cell transmits interference information on an interfering UE 1, 2, 3, 4 and 5 and all NAICS UEs of a serving cell, i.e., a UE 1, 2, 3, and 4, receive the interference information and may be then able to use interference information respectively necessary for the UE 1, 2, 3, and 4 only.

Table 3 in the following shows an example of interference information (IPs, Interference Parameters).

TABLE 3

| | Parameters |
|---|---|
| Independently from the TM used in the Interfering cell. | CFI<br>MBSFN configuration<br>RI<br>CRS AP<br>Cell ID<br>Modulation Order<br>MCS<br>RNTI<br>TM |
| If CRS TMs are used in Interfering cell | PMI<br>Data to RS EPRE, PA, PB<br>System bandwidth<br>PDSCH allocation |
| If DM-RS TMs are used in Interfering cell | PDSCH bandwidth for DM-RS<br>Data to RS EPRE, PB<br>DMRS APs<br>nSCID<br>CSI-RS presence and their pattern<br>Virtual cell ID |

Embodiment 1

Since it is necessary for a base station to inform a NAICS UE of not only control information on desired data but also interference information, additional PDCCH/ePDCCH overhead occurs. In order to minimize the overhead, it is preferable that the base station informs the NAICS UE of the interference information only when the NAICS UE is able to efficiently cancel interference using the interference information.

When the interference information is delivered via unicast, if the M numbers of UEs perform NAICS only among the N number of scheduled NAICS UEs, it may be able to reduce overhead for delivering the interference information.

For example, referring to FIG. 13, when the UE 1, 2, 3, and 4 have NAICS capability, if it is preferable for the UE 2, 3 and 4 to perform NAICS only in consideration of a channel status, it is not necessary for the UE 1 to receive interference information on the interfering UE 1, 2, and 3. In particular, in this case, if a base station does not transmit the interference information on the interfering UE 1, 2, and 3, it is able to save a resource.

On the contrary, when interference information is delivered via broadcasting, if there exists a UE practically performing NAICS irrespective of whether or not a specific NAICS UE performs NAICS, overhead for delivering the interference information is the same. Hence, a method according to the present embodiment can be more efficiently used in a unicast scheme.

Although a NAICS UE has capability capable of cancelling interference of an interfering cell, the NAICS UE may fail to cancel the interference depending on a channel status. Moreover, an attempt to cancel the interference may lead to a result of intensifying the interference.

For example, if reception power from an interfering cell is considerably weaker than reception power from a serving cell, it is difficult to precisely decode an interference signal of the interfering cell (in case of interference cancellation of a codeword level, both decoding and channel decoding are performed). This is because desired data works as considerably big interference when the interference signal is decoded.

Hence, when the reception power received from the interfering cell estimated from an RS and the reception power received from the serving cell are compared with each other, if the reception power received from the interfering cell is considerably weaker than the reception power received from the serving cell, it is determined as it may be preferable for the NAICS UE not to perform NAICS and it is necessary for the NAICS UE not to make a request for unnecessary interference information. Otherwise, since it is preferable to perform NAICS, is necessary for the NAICS UE to make a request for interference information.

The NIACS UE makes feedback on the interference information request to a base station via 1 bit IPR (Interference Parameters Request) and the base station determines whether to provide interference information to the NAICS UE according to the IPR. For example, if a value of the IPR corresponds to 0, the base station provides no interference information to the NAICS UE. If the value of the IPR corresponds to 1, the base station provides interference information to the NAICS UE.

The IPR can be delivered via PUCCH CSI feedback. For example, the IPR can be delivered together with an RI.

In this case, it may be preferable for a UE to calculate a CSI (e.g., RI, PMI, CQI, etc.) with a different scheme according to a value of the IPR. If the IPR corresponds to 0, since the UE assumes that the base station does not transmit interference information, the UE calculates an optimized CSI capable of being achieved without performing NAICS. On the contrary, if the IPR corresponds to 1, the UE calculates an optimized CSI capable of being achieved by performing NAICS.

As mentioned above, if the IPR and a scheme of calculating CSI are tied up, the IPR can be interpreted not only as a meaning of requesting interference information but also as a meaning indicating whether or not there is NAICS of a reported CSI. In particular, when a UE reports an optimized CSI capable of achieving by performing NAICS, the IPR is set to 1. When the UE reports an optimized CSI while not considering NAICS, the IPR is set to 0.

In the example mentioned above, although the IPR is reported together with the RI, the IPR can be reported together with a CQI to report the IPR with a more frequent interval.

Besides the IPR reported to the base station by the UE, if the base station is able to determine whether or not a NAICS UE performs NAICS, the base station may transmit information (IPE, Information Parameter Existence) equivalent to the IPR to the UE.

If the base station transmits the IPE corresponding to 0 to the UE, the UE does not expect interference information provided by the base station and the UE does not perform NAICS. On the contrary, if the IPE corresponds to 1, the UE expects the interference information provided by the base station and performs NAICS using the received interference information.

According to the present embodiment, the base station transmits interference information to a NAICS UE only when the NAICS UE is able to perform NAICS. By doing so, additional PDCCH/ePDCCH overhead for delivering interference information can be minimized.

Embodiment 2

As mentioned in the foregoing description, the NAICS UE can report CSI of two types depending on whether or not the NAICS UE performs NAICS.

For clarity, an optimized CSI capable of being achieved by performing NAICS is referred to as a NAICS CSI and an optimized CSI capable of being achieved without performing NAICS is referred to as a normal CSI.

A UE informs a base station of whether a reported CSI corresponds to a normal CSI or a NAICS CSI by making a feedback on a CTI (CSI type indicator) of 1 or 2-bit to the base station.

If the reported CSI corresponds to the normal CSI, the base station does not transmit interference information to a corresponding NAICS UE. If the reported CSI corresponds to the NAICS CSI, the base station transmits interference information to the NAICS UE. For example, if the CTI corresponds to 0, the UE makes a feedback on the normal CSI. If the CTI corresponds to 1, the UE makes a feedback on the NAICS CSI.

The UE can make a feedback on a CTI using one of the following operations.

As a first operation, the UE makes a feedback on the CTI together with an RI.

If the CTI corresponds to 0, the UE makes feedback on a normal CSI until a next CTI is updated. If the CTI corresponds to 1, the UE makes feedback on a NAICS CSI until a next CTI is updated.

As a second operation, the UE transmits a CTI in a manner of tying the CTI with a PTI.

The PTI stands for a precoder type indicator. A type of a precoder fed back by the UE varies depending on a value of the PTI.

If the CTI is tied up with the PTI, the PTI operates as a CSI type indicator as well as a meaning of the PTI itself. In particular, if the PTI corresponds to 0, the UE makes feedback on a normal CSI until a next PTI is updated. If the PTI corresponds to 1, the UE makes a feedback on a NAICS CSI until a next PTI is updated.

As a third operation, the UE makes feedback on a CTI together with a CQI.

If a CTI corresponds to 0, the UE makes a feedback on a normal CQI. If the CTI corresponds to 1, the UE makes a feedback on a NAICS CQI. If a CQI and a PMI are transmitted together or a PMI is transmitted between a currently reported CQI and a next reported CQI, the PMI may correspond to a normal PMI or a NAICS PMI depending on a CTI.

A CQI is transmitted via a PUCCH format 2. According to a current LTE standard, the PUCCH format 2 is designed to transmit maximum 13-bit payload. In a normal CP and an extended CP, actual payload carried on the PUCCH format 2 corresponds to 11 bits and 13 bits, respectively. Hence, in a normal CP, it is able to transmit a CTI equal to or less than 2 bits together with a CQI via the PUCCH format 2. Yet, it is impossible to transmit the CTI together with the CQI in the extended CP. In consideration of this, in order to report a CQI and a CTI together in a rank equal to or greater than 2, it may be preferable to newly configure a PUCCH format capable of transmitting greater payload. Or, it is able to distinguish a normal CP case from an extended CP case. In particular, in the normal CP, a CTI and a CQI can be reported together via the PUCCH format 2. On the contrary, in the extended CP, it may be able to restrict a CTI to be reported via a new PUCCH format or not to be reported.

If a CTI is 2 bits, the CTI can be defines as follows. CTI 00, 01, 10, and 11 can be defined as a normal CSI, a NAICS CSI, a normal CSI+NAICS CSI, and reserved, respectively. If the CTI corresponds to 10, a UE reports both a normal CSI and a NAICS CSI via PUCCH. A base station receives feedback on the NAICS CSI and the normal CSI from the UE and may be then able to determine whether to provide interference information to the UE. For example, if a difference between a NAICS CQI and a normal CQI is not big, the base station configures MCS on the basis of the normal CQI and does not provide interference information to the UE, thereby saving a resource. On the contrary, if the difference between the NAICS CQI and the normal CQI is big, the base station configures MCS on the basis of the NAICS CQI and provides interference information to the UE.

If the CTI corresponds to 10, the UE can report both the normal CSI and the NAICS CSI via the PUCCH according to one of following operations.

As a first operation, a period of a NAICS CQI can be configured by a multiple of a period of a CQI feedback. In this case, offset can be identical to each other.

If a subframe in which a NAICS CQI is fed back and a subframe in which a normal CQI is fed back are collided with each other, the NAICS CQI is preferentially fed back.

As a second operation, the UE can make a feedback via a PUCCH format 2 only when a CP corresponds to a normal CP.

The UE can feedback a difference value of a NAICS CQI (i.e., delta CQI) based on a normal CQI together with the normal CQI via a PUCCH format 2.

According to a current LTE standard, in case of a normal CP, since there exists a margin payload of 2 bits, it is able to additionally report 2-bit delta CQI. When two normal CQIs are reported together in response to two codewords, a delta CQI is commonly applied to the two normal CQIs. For example, if the delta CQI corresponds to +k, a NAICS CQI of a codeword 1 and a NAICS CQI of a codeword 2 correspond to a normal CQI+k of the codeword 1 and a normal CQI+k of the codeword 2, respectively.

As a third operation, the UE reports a delta CQI together with an RI.

The UE reports a delta CQI together with an RI and reports a normal CQI using a scheme identical to a legacy scheme. When two normal CQIs are reported together in response to two codewords, a delta CQI is commonly applied to the two normal CQIs.

As a fourth operation, the UE can make a report as follows for a Mode 2-1.

If a PTI correspond to 0 in the Mode 2-1, the UE reports a delta CQI and W1 together and the UE reports a normal CQI using a scheme identical to a legacy scheme.

If a PTI correspond to 1 in the Mode 2-1, a delta CQI is transmitted instead of a wideband CQI. A subband CQI is reported using a scheme identical to a legacy scheme using a normal CQI. On the contrary, a normal CQI is transmitted instead of a wideband CQI and a subband CQI is transmitted using a delta CQI.

As a fifth operation, it may use a feedback method dependent of a rank.

If a feedback is made in response to a single codeword, a NAICS CQI and a normal CQI are transmitted at the same time using a PUCCH format 2. In particular, if an RI corresponds to 1, the NAICS CQI and the normal CQI are reported at the same time using. If an RI is greater than 1, it may use one of the aforementioned first to the fourth operation.

Embodiment 3

Embodiment 3 of the present invention relates to a method for a base station to inform a UE of a CTI and a method for the UE to calculate and report a NAICS CSI or a normal CSI according to the CTI.

A base station checks a control channel capacity of the base station. If it is determined as the control channel capacity is short, the base station sets a CTI to 0, receives a normal CSI and does not transmit interference information. Or, when the CTI is sets to 1, if the base station continuously receives NAK from a NAICS UE in response to a DL signal, it may be preferable for the base station to set the CTI to 0 and command to increase a normal CQI. Of course, although it is able to reconfigures a CQI via OLLA, it may take great amount time in the course of searching for a correct CQI. Hence, it is preferable to use a CTI.

The base station semi-statically or dynamically informs the UE of a CTI.

When a CTI is semi-statically informed, the CTI is configured according to a CSI process and the UE determines a scheme of calculating a CSI with reference to the CTI defined according to each process.

When a CTI is dynamically informed, the CTI is added to a DCI for UL grant and then the CTI is informed to the UE. A CSI request field is defined in the UL grant DCI. In this case, whether PUSCH CSI feedback corresponding to the CSI request field is performed by a NAICS CSI, a normal CSI, or both the NAICS CSI and the normal CSI is determined according to the CTI added to the DCI. In addition, the UE determines a CSI type of PUCCH CSI feedback according to a value of the CTI.

In the embodiments 2 and 3, a scheme for a UE to feedback a CTI to a base station and a scheme for the base station to transmit to the UE have been explained, respectively. Yet, the schemes are not limited to CTI signaling. The schemes can be identically applied to IPR or IPE signaling as well. In particular, in the first to the third operation of the CTI feedback scheme of the embodiment 2, it is able to apply the identical feedback scheme in a manner of replacing a CTI with an IPR. And, in the CTI transmission scheme of the embodiment 3, it is able to apply the identical feedback scheme in a manner of replacing a CTI with an IPE.

And, in the embodiments 2 and 3, although a CTI indicates a CSI type, the CTI may have a meaning of the IPR and a meaning of the IPE at the same time. In particular, if the CTI corresponds to 0, it may indicate that there is no interference information request except a normal CSI feedback. Similarly, if the CTI corresponds to 1, it may indicate that there is an interference information request except a NAICS CI feedback.

The UE may be able to report the IPR or the CTI via such a random uplink channel as a scheduling request instead of transmitting the IPR or the CTI together with a PUCCH CSI feedback.

Meanwhile, although the aforementioned embodiments of the present invention have been explained under an assumption of NAICS of an inter-cell situation, characteristics of the present invention can be identically applied to NAICS of a MU-MIMO situation as well. In particular, in the aforementioned embodiments of the present invention, a scheme of calculating a CSI and a feedback scheme have been explained under an assumption that a UE receives interference from a data signal transmitted to a different UE of a neighbor cell and the UE is able to appropriately cancel the interference. However, the characteristics of the present invention can be identically applied to a case that a UE receives interference from a data signal transmitted to a different UE of an identical cell on which MU-MIMO is performed and the UE appropriately cancels the interference.

Figure 14:
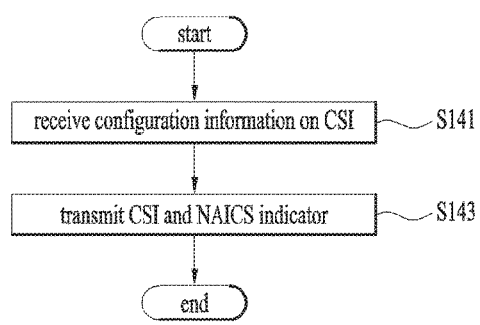
FIG. 14 is a flowchart for a method of receiving a signal according to one embodiment of the present invention.

A method of receiving a signal according to one embodiment of the present invention is explained with reference to FIG. 14 in the following.

In the step S141, a UE receives configuration information on a channel state information.

Subsequently, in the step S143, the UE reports an indicator indicating whether or not the channel state information is calculated based on NAICS (network-assisted interference cancellation and suppression) to a base station.

Since detail contents according to the aforementioned steps are identical to detail contents of the present invention mentioned earlier with reference to FIGS. 12 and 13, explanation on the contents is omitted at this time.

Figure 15:
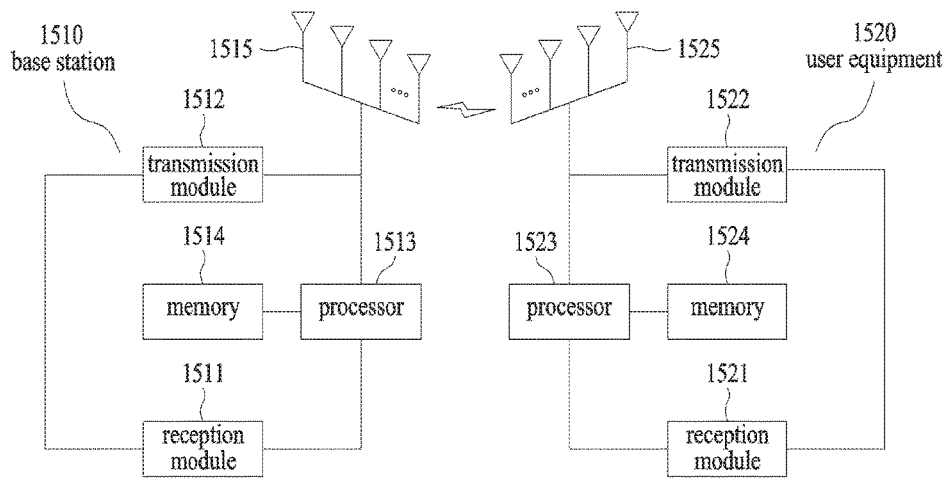
FIG. 15 is a diagram for configurations of a base station and a user equipment capable of being applied to one embodiment of the present invention.

FIG. 15 is a diagram for a base station and a user equipment capable of being applied to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 15, a wireless communication system includes a base station (BS) 1510 and a user equipment (UE) 1520. The BS 1510 includes a processor 1513, a memory 1514 and a radio frequency (RF) unit 1511/1512. The processor 1513 can be configured to implement the proposed functions, processes and/or methods. The memory 1514 is connected with the processor 1513 and then stores various kinds of information associated with an operation of the processor 1513. The RF unit 1516 is connected with the processor 1513 and transmits and/or receives a radio signal. The user equipment 1520 includes a processor 1523, a memory 1524 and a radio frequency (RF) unit 1521/1522. The processor 1523 can be configured to implement the proposed functions, processes and/or methods. The memory 1524 is connected with the processor 1523 and then stores various kinds of information associated with an operation of the processor 1523. The RF unit 1521/1522 is connected with the processor 1523 and transmits and/or receives a radio signal. The base station 1510 and/or the user equipment 1520 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The present invention can be used for a wireless communication device such as a user equipment, a relay, a base station, and the like.

What is claimed is:

1. A method of receiving the signal by a user equipment in a wireless communication system, the method performed by the user equipment comprising:
   receiving configuration information on channel state information (CSI); and
   reporting the CSI and an indicator,
   wherein the indicator indicates a type of the CSI,
   wherein a normal CSI calculated without network-assisted interference cancellation and suppression (NAICS) is reported when the indicator corresponds to a first value,
   wherein a NAICS CSI calculated based on the NAICS is reported when the indicator corresponds to a second value, and
   wherein the normal CSI and the NAICS CSI are reported when the indicator corresponds to a third value; and
   receiving interference information from the base station when the indicator corresponds to the third value and a difference between the normal CSI and the NAICS CSI is equal to or greater than a threshold.

2. The method of claim 1, wherein if reporting of the normal CSI and reporting of the NAICS CSI are collided with each other in a subframe, the NAICS CSI is preferentially reported.

3. The method of claim 1, wherein the CSI corresponds to a Channel Quality Indicator (CQI).

4. The method of claim 1, wherein the normal CSI and the NAICS CSI are reported at the same time only when a Rank Indicator (RI) corresponds to 1.

5. A user equipment for receiving the signal in a wireless communication system, the user equipment comprising:
   a Radio Frequency (RF) unit; and
   a processor, wherein the processor is configured to:
      receive configuration information on channel state information (CSI),
      report the CSI and an indicator,
      wherein the indicator indicates a type of the CSI,
      wherein a normal CSI calculated without network-assisted interference cancellation and suppression (NAICS) is reported when the indicator corresponds to a first value,
      wherein a NAICS CSI calculated based on the NAICS is reported when the indicator corresponds to a second value,
      wherein the normal CSI and the NAICS CSI are reported when the indicator corresponds to a third value, and
      wherein the user equipment receives interference information from the base station when the indicator corresponds to the third value and a difference between the normal CSI and the NAICS CSI is equal to or greater than a threshold.

6. The user equipment of claim 5, if reporting of the normal CSI and reporting of the NAICS CSI are collided with each other in a subframe, the NAICS CSI is preferentially reported.

7. The user equipment of claim 5, wherein the channel CSI corresponds to a Channel Quality Indicator (CQI).

8. The user equipment of claim 5, wherein the normal CSI and the NAICS CSI are reported at the same time only when a Rank Indicator (RI) corresponds to 1.

\* \* \* \* \*